United States Patent [19]
Ochiai

[11] Patent Number: 5,273,947
[45] Date of Patent: Dec. 28, 1993

[54] NOBLE METAL-CONTAINING OVERGLAZE COLOR COMPOSITION FOR CERAMICS

[75] Inventor: Naosuke Ochiai, Nagoya, Japan

[73] Assignee: Nippon Kin-Eki Co., Ltd., Nagoya, Japan

[21] Appl. No.: 759,574

[22] Filed: Sep. 16, 1991

[30] Foreign Application Priority Data

Sep. 14, 1990 [JP] Japan ................... 2-245278

[51] Int. Cl.$^5$ ................... C03C 8/18; C03C 8/14
[52] U.S. Cl. ........................ 501/19; 501/14; 501/17
[58] Field of Search ............ 501/11, 14, 17, 19; 252/512, 514; 524/270, 434, 435; 75/228

[56] References Cited

U.S. PATENT DOCUMENTS 2,351,974  6/1944  Kollmar ................................ 106/1

FOREIGN PATENT DOCUMENTS

| | | |
|---|---|---|
| 226654 | 1/1925 | United Kingdom . |
| 599675 | 3/1948 | United Kingdom . |
| 937865 | 9/1963 | United Kingdom . |
| 966491 | 6/1965 | United Kingdom . |
| 1002293 | 8/1965 | United Kingdom . |
| 115511 | 6/1969 | United Kingdom . |
| 1414500 | 11/1975 | United Kingdom . |
| 1533628 | 11/1978 | United Kingdom . |
| 2131833 | 6/1984 | United Kingdom ............ 501/19 |

*Primary Examiner*—Mark L. Bell
*Assistant Examiner*—M. Marcheschi
*Attorney, Agent, or Firm*—Larson and Taylor

[57] ABSTRACT

There is disclosed a noble metal-containing overglaze colour composition in a liquid or paste form for application to ceramics. The composition comprises (1) a solution or paste of a resinate of a noble metal, (2) an amount sufficient to serve as a sintering inhibitor and alkali resistance improving agent of a solution or paste of a thorium resinate, (3) an adhesive, in particular bismuth, (4) an appropriate amount of a rosin and (5) an appropriate amount of a solvent and, further, wherein required, (6) chromium and (7) a small amount of rhodium. Preferably, the noble metal is gold, platinum or palladium.

5 Claims, No Drawings

NOBLE METAL-CONTAINING OVERGLAZE COLOR COMPOSITION FOR CERAMICS

BACKGROUND OF THE INVENTION

This invention relates to an improvement in the noble metal-containing overglaze color composition in a liquid or paste form for application to ceramics.

So far, Rh (rhodium) has been used as a main component of the sintering inhibitor for noble metalcontaining overglaze color compositions in a liquid or paste form to be applied to ceramics, inclusive of pottery, chinaware, glassware, etc., with Cr, Bi, V and/or B, for instance, being additionally used, so that a pretty noble metal mirror surface can be obtained on the ceramic surface by firing and the alkali resistance of the thin noble metal film or layer produced by firing can be improved.

However, since the demand for rhodium is great in spite of limited sources therefor, the price of rhodium is increasing and it is becoming more and more difficult to use rhodium as a sintering inhibitor for noble metal-containing overglaze compositions.

Furthermore, when rhodium is used, the alkali resistance of the noble metal mirror surface formed on the ceramic surface is not fully satisfactory. For instance, in a boiling alkali resistance test at 100° C. using a 2% aqueous solution of sodium carbonate, the noble metal (gold) mirror surface layer formed from the noble metal- and rhodium-containing overglaze composition specified later herein in Table C-I completely peeled off after the lapse of about 10 minutes in the case of firing at 600° C., about 50 minutes in the case of firing at 700° C., and about 80 minutes in the case of firing at 800° C.

Thus, the conventional use of rhodium as a sintering inhibitor for noble metal-containing overglaze compositions encounters not only the problem that it is very costly but also the problem that it does not always lead to satisfactory alkali resistance.

SUMMARY OF THE INVENTION

The present invention, completed as a result of research and development works made to solve the above problems, relates to an improvement in the noble metal-containing overglaze color composition in a liquid or paste form for application to ceramics.

The inventors of the present invention made intensive investigations with a number of experiments and, as a result, surprisingly found that thorium, which is by far more inexpensive and readily available than rhodium so far used, is at least comparable in sintering inhibiting activity to rhodium and at the same time can markedly improve the alkali resistance of the noble metal layer formed from the rhodium-containing overglaze composition. The present invention has been completed based on these findings.

It is an object of the invention to provide a noble metal-containing overglaze color composition in a liquid or paste form for application to ceramics with which composition the alkali resistance of the thin noble metal layer formed on the surface of ceramics by firing can be markedly improved and the pretty noble metal mirror surface can be maintained for a prolonged period of time.

Another object of the invention is to provide a noble metal-containing overglaze color composition which in a liquid or paste form for application to ceramics with which composition the sintering inhibiting effect on the thin noble metal layer formed on the surface of ceramics by firing can be markedly improved and a pretty noble metal mirror surface can be assuredly produced by firing.

A further object of the invention is to provide a noble metal-containing overglaze color composition having the excellent characteristic features mentioned above very inexpensively and easily.

DETAILED DESCRIPTION OF A PREFERRED EMBODIMENT OF THE INVENTION

The noble metal-containing overglaze color composition in a liquid or paste form for application to ceramics, which is provided by the invention, is characterized in that it comprises a solution or paste of a resinate of a noble metal, in particular gold, platinum or palladium, 1 to 8 parts by weight, per 100 parts by weight of the noble metal, of a thorium resinate as a sintering inhibitor and alkali resistance improving agent and, according to the conventional practice, an appropriate amount of an adhesive, for example bismuth, if necessary with a small amount of rhodium added. Preferably, the bismuth is present in an amount of 1 to 10 parts by weight and the Rh is present in an amount of 0.02 to 3 parts by weight per 100 parts by weight of the noble metal. The term "resinate" as used herein includes metallo-organic compounds derived from organic acids, such as resin acids and rosin acids, oleic acid, stearic acid, naphthenic acid and abietic acid, as well as noble metal salts of sulphurized terpenes prepared by reacting terpenes, such as pinenes, dipentene, terpineols and cineoles, with sulphur at 150° C. to 190° C.

The noble metal-containing overglaze color composition of the invention which comprises the components mentioned above and is in a liquid or paste form and to be applied to ceramics is characterized, from the performance viewpoint, in that by using Th either singly or in combination with a small amount of Rh in contrast to the conventional single use of Rh, the sintering inhibiting effect can be markedly improved to give a pretty nobel metal mirror surface consisting of a thin noble metal layer on the surface of ceramics, as compared with the single use of Rh.

The composition mentioned above is also characterized, with great advantage, in that the alkali resistance of the thin noble metal layer formed by application thereof to the ceramic surface followed by firing can be markedly improved and the pretty noble metal mirror surface can be long preserved even under severe conditions of use.

From the economical viewpoint, said composition is characterized in that it can be provided very costlessly since the sintering inhibitor thorium is much less expensive than rhodium.

Several examples are given below to facilitate the understanding of the present invention.

EXAMPLE I

According to the formulation shown in Table A-I, a gold-containing liquid overglaze color composition (liquid bright gold) having a gold content of 11% and containing thorium as a sintering inhibitor was prepared. Said composition was applied to the surface of ceramics. In the case of pottery and chinaware, firing was performed at 600° C.-800° C. The metal composition of the thin gold layer thus formed is shown in Table B-I.

TABLE A-I

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 40.28 |
| Th resinate dissolved in terpineol oil, as sintering inhibitor (5.27%) | 4.48 |
| Cr resinate dissolved in terpentine oil, as heating catalyst (2.74%) | 2.45 |
| Bi resinate dissolved in terpentine oil, as adhesive | 6.38 |
| Powdered rosin | 18.10 |
| Solvent composed of 90% toluene and 10% benzyl alcohol | 28.31 |

TABLE B-I

| | (weight %) |
|---|---|
| Au | 94.02 |
| Th | 2.02 |
| Cr | 0.57 |
| Bi | 3.39 |

The thin, sintering-free, uniform and bright gold layer having the metal composition shown in Table B-I was subjected to testing for boiling alkali resistance at 100° C. using a 2% aqueous solution of sodium carbonate. When the firing temperature was 600° C., 700° C. or 800° C., the thin gold layer remained quite peel-free after about 15 minutes, about 2 hours, or about 5 hours of boiling, respectively, with the original pretty gold mirror surface being retained.

EXAMPLE II

According to the formulation shown in Table A-II, a gold-containing liquid overglaze color composition (liquid bright gold) having a gold content of 11% and containing Th as a sintering inhibitor in combination with an appropriate amount of Rh was prepared and applied to the surface of ceramics. In the case of pottery and chinaware, firing was performed at 700° C. to 800° C. The metal composition of the thin gold layer thus formed is shown in Table B-II.

TABLE A-II

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 40.28 |
| Rh resinate dissolved in terpentine oil, as sintering inhibitor (4.05%) | 0.60 |
| Th resinate dissolved in terpentine oil, as sintering inhibitor (5.27%) | 4.48 |
| Cr resinate dissolved in terpentine oil, as heating catalyst (2.74%) | 2.45 |
| Bi resinate dissolved in terpentine oil, as adhesive (6.22%) | 6.38 |
| Powdered rosin | 17.90 |
| Solvent composed of 90% toluene and 10% benzyl alcohol | 27.91 |

TABLE B-II

| | |
|---|---|
| Au | 93.82 |
| Rh | 0.21 |
| Th | 2.01 |
| Cr | 0.57 |
| Bi | 3.39 |

The thin, sintering-free uniform and bright gold layer having the metal composition shown in Table B-II was tested for boiling alkali resistance under the same conditions as used in Example 1. The thin gold layer was quite peel-free after about 2 hours of boiling in the case of firing at 700° C., and after about 5 hours of boiling in the case of firing at 800° C. In each case, the original pretty gold mirror surface could be retained.

EXAMPLE III

According to the formulation shown in Table A-III, a palladium-containing liquid overglaze color composition having a gold content of 11% and containing thorium as a sintering inhibitor was prepared and applied to the surface of ceramics. In the case of pottery and chinaware, firing was performed at 800° C. The metal composition of the thin palladium layer thus formed is shown in Table B-III.

TABLE A-III

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 21.97 |
| Pd resinate prepared by dissolving powdered sulfurized terpineol palladium in a solvent composed of 60% turpentine oil, 20% benzyl alcohol and 20% powdered rosin (7.69%) | 7.00 |
| Th resinate dissolved in terpentine oil, as sintering inhibitor (5.27%) | 3.00 |
| Cr resinate dissolved in terpentine oil, as heating catalyst (2.74%) | 1.50 |
| Bi resinate dissolved in terpentine oil, as adhesive (6.22%) | 4.00 |
| Powdered rosin | 24.38 |
| Solvent composed of 90% toluene and 10% benzyl alcohol | 38.15 |

TABLE B-III

| | |
|---|---|
| Au | 85.88 |
| Pd | 7.70 |
| Th | 2.26 |
| Cr | 0.59 |
| Bi | 3.57 |

The thin, sintering-free, bright palladium layer having the metal composition shown in Table B-III was tested for boiling alkali resistance under the same conditions as used in Example 1. In the case of the firing temperature of 800° C., the thin palladium layer did not peel at all even after 4 hours of boiling and could retain the original pretty mirror surface.

EXAMPLE IV

According to the formulation shown in Table A-IV, a platinum-containing liquid overglaze color composition was prepared by adding a palladium-containing liquid and a platinum-containing liquid to a gold-containing liquid having a gold content of 11%, in which composition a combination of Th and an appropriate amount of Rh was used as a sintering inhibitor. The composition was applied to the surface of ceramics. In the case of pottery and chinaware, firing was performed at 800° C. The metal composition of the thin platinum layer thus formed is shown in Table B-IV.

TABLE A-IV

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 21.97 |

TABLE A-IV-continued

| | (weight %) |
|---|---|
| Pd resinate prepared by dissolving powdered sulfurized tepineol palladium in a solvent composed of 60% turpentine oil, 20% benzyl alcohol and 20% powdered rosin (7.69%) | 7.00 |
| Pt resinate prepared by dissolving powdered sulfurized terpineol platinum in a solvent composed of 60% terpentine oil, 20% benzyl alcohol and 20% powdered rosin (10.00%) | 2.00 |
| Th resinate dissolved in terpentine oil, as sintering inhibitor (4.05%) | 2.50 |
| Rh resinate dissolved in terpentine oil, as sintering inhibitor (5.27%) | 0.50 |
| Cr resinate dissolved in terpentine oil, as heating catalyst (2.74%) | 1.50 |
| Bi resinate dissolved in terpentine oil, as adhesive (6.22%) | 8.00 |
| Powdered rosin | 22.00 |
| Solvent composed of 90% toluene and 10% benzyl alcohol | 35.30 |

TABLE B-IV

| | |
|---|---|
| Au | 81.03 |
| Pd | 7.27 |
| Pt | 2.70 |
| Rh | 1.36 |
| Th | 0.35 |
| Cr | 0.55 |
| Bi | 6.73 |

Since the Pt resinate is highly catalytic and ignites spontaneously upon heating to 300° C. or above, it is a common practice to use an organosulfur compound as a catalyst poison or decrease the Pt content. In the case of single noble metal compositions where the metal is Pt, therefore, little difference was found between Rh and Th in alkali resistance testing.

However, in cases where a plurality of noble metals were used combinedly, such as in the case shown in Table A-IV, it was found that Th, when used in combination with Rh, can serve not only as a sintering inhibitor but also effectively as an alkali resistance improving agent. Thus, the thin, sintering-free, uniform platinum-containing layer having the metal composition shown in Table B-IV, when subjected to a boiling alkali resistance test under the same conditions as used in Example 1, remained peel-free even after about 3 hours of boiling in the case of firing at 800° C. and could retain the original pretty platinum mirror surface. These results were better than those obtained in a comparative example to be mentioned later herein where Rh alone was used as a sintering inhibitor.

EXAMPLE V

A gold-containing liquid mat overglaze composition prepared by adding powdered gold to a gold-containing liquid composition having a gold content of 11%, with thorium used as a sintering inhibitor, was prepared according to the formulation shown in Table A-V and applied to the surface of ceramics. In the case of pottery and chinaware, firing was performed at 700° C. to 800° C. The metal composition of the thin mat gold layer thus formed is shown in Table B-V.

TABLE A-V

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 40.28 |
| Th resinate dissolved in terpentine oil, as sintering inhibitor (5.27%) | 4.00 |
| Cr resinate dissolved in terpentine oil, as heating catalyst (2.74%) | 2.00 |
| Bi resinate dissolved in terpentine oil, as adhesive (6.22%) | 4.00 |
| Powdered gold | 0.70 |
| Powdered rosin | 21.06 |
| Solvent composed of 90% toluene and 10% benzyl alcohol | 27.96 |

TABLE B-V

| | |
|---|---|
| Au | 59.41 |
| Th | 1.14 |
| Cr | 0.30 |
| Bi | 1.34 |
| Powered gold | 37.81 |

The mat, thin, sintering-free gold layer having the metal composition shown in Table B-V, when tested for boiling alkali resistance under the same conditions as used in Example 1, showed no peeling off at all after about 2 hours of boiling in the case of firing at 700° C., and after about 5 hours of boiling in the case of firing at 800° C. In each case, the original pretty mat gold mirror surface could be retained.

EXAMPLE VI

A gold-containing paste overglaze color composition having a gold content of 11% and containing thorium as a sintering inhibitor was prepared according to the formulation shown in Table A-VI and applied to the ceramic surface by screen printing. In the case of pottery and chinaware, firing was performed at 600° C. to 800° C. The metal composition of the thin gold layer thus formed is shown in Table B-VI.

TABLE A-VI

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 40.28 |
| Th resinate dissolved in terpentine oil, as sintering inhibitor (5.27%) | 4.48 |
| Cr resinate dissolved in terpentine oil, as heating catalyst (2.74%) | 2.45 |
| Bi resinate dissolved in terpentine oil, as adhesive (6.22%) | 6.38 |
| Sulfurized balsam | 6.00 |
| Powdered rosin | 16.16 |
| Solvent composed of 90% toluene and 10% benzyl alcohol | 24.25 |

TABLE B-VI

| | |
|---|---|
| Au | 94.02 |
| Th | 2.02 |
| Cr | 0.57 |
| Bi | 3.39 |

The sintering-free, thin, uniform, bright gold layer having the metal composition shown in Table B-VI was tested for boiling alkali resistance under the same conditions as used in Example 1 to give substantially the same results as obtained in Example 1.

Notes (1) The numerical values for metals as shown hereinbefore in each example do not indicate the values for the oxide form but indicate the metal contents.

(2) The "thorium" used in the examples mentioned above means any organic compound capable of giving the structure Th upon firing in air.

In the practice of the invention, the level of addition of thorium is set at 1 to 8 parts by weight per 100 parts by weight of noble metal(s) on the following grounds. When the thorium addition level is below 1 part by weight, the thin noble metal layer formed by firing on the ceramic surface cannot be fully prevented from sintering and, at the same time, the alkali resistance of said thin gold layer decreases At thorium addition levels exceeding 8 parts by weight, the degree of noble metal color development decreases and this results in failure to give pretty noble metal mirror surfaces; the adhesion of the thin noble metal layer also decrease While the addition of Cr is not an essential element of the invention, the level of addition of Cr, if used, is desirably within the range of 0.1 to 1.5 parts per 100 parts of noble metal(s).

In the following, comparative examples are given where rhodium was used in the conventional manner in lieu of thorium used in the foregoing examples as a sintering inhibitor and alkali resistance improving agent.

COMPARATIVE EXAMPLE I

A gold-containing liquid overglaze color composition (liquid bright gold) having a gold content of 11% and containing rhodium as a sintering inhibitor was prepared according to the formulation shown in Table C-I and was applied to the surface of ceramics. In the case of pottery and chinaware, firing was performed at 600° C. to 800° C. The metal composition of the thin gold layer thus formed is shown in Table D-I.

TABLE C-I

|  | (weight %) |
|---|---|
| Au resinate prepared by dissolving powdered sulfurized terpineol gold in a solvent composed of 60% turpentine oil, 20% benzyl alcohol and 20% powdered rosin (27.31%) | 40.28 |
| Rh resinate dissolved in terpentine oil, as sintering inhibitor (4.05%) | 1.35 |
| Cr resinate dissolved in terpentine oil, as heating catalyst (2.74%) | 1.53 |
| Bi resinate dissolved in terpentine oil, as adhesive (6.22%) | 4.47 |
| Powdered rosin | 20.42 |
| Solvent composed of 90% toluene and 10% benzyl alcohol | 31.95 |

TABLE D-I

| Au | 96.70 |
|---|---|
| Rh | 0.48 |
| Cr | 0.37 |
| Bi | 2.45 |

The thin, sintering-free, uniform and bright gold layer having the metal composition shown in Table D-I was tested for boiling alkali resistance at 100° C. using a 2% aqueous solution of sodium carbonate. The thin gold layer was completely peeled off by about 10 minutes of boiling in the case of firing at 600° C., by about 50 minutes of boiling in the case of firing at 700° C., and by about 1 hour and 20 minutes of boiling in the case of firing at 800° C.

COMPARATIVE EXAMPLE II

According to the formulation shown in Table C-II, a palladium-containing liquid overglaze color composition was prepared by adding a palladium-containing liquid to a gold-containing liquid having a gold content of 11%. Rhodium was used as a sintering inhibitor in that composition. The palladium-containing liquid composition was applied to the surface of ceramics. In the case of pottery and chinaware, firing was performed at 800° C. The metal composition of the thin palladium layer thus formed is shown in Table D-II.

TABLE C-II

|  | (weight %) |
|---|---|
| Au resinate prepared by dissolving powdered sulfurized terpineol gold in a solvent composed of 60% turpentine oil, 20% benzyl alcohol and 20% powdered rosin (27.31%) | 21.97 |
| Pd resinate prepared by dissolving powdered sulfurized terpineol palladium in a solvent composed of 60% turpentine oil, 20% benzyl alcohol and 20% powdered rosin (7.69%) | 7.00 |
| Rh resinate dissolved in terpentine oil, as sintering inhibitor (4.05%) | 2.00 |
| Cr resinate dissolved in terpentine oil, as heating catalyst (2.74%) | 1.50 |
| Bi resinate dissolved in terpentine oil, as adhesive (6.22%) | 4.00 |
| Powdered rosin | 24.77 |
| Solvent composed of 90% toluene and 10% benzyl alcohol | 38.76 |

TABLE D-II

| Au | 86.84 |
|---|---|
| Pd | 7.79 |
| Rh | 1.17 |
| Cr | 0.59 |
| Bi | 3.61 |

The thin, sintering-free, bright palladium layer having the metal composition shown in Table D-II was tested for boiling alkali resistance under the same conditions as used in Comparative Example I. The thin palladium layer peeled off completely after about 1 hour of boiling even in the case of firing at 800° C.

COMPARATIVE EXAMPLE III

According to the formulation shown in Table C-III, a platinum-containing liquid overglaze color composition was prepared by adding a palladium-containing liquid and a platinum-containing liquid to a gold-containing liquid having a gold content of 11% and using rhodium as a sintering inhibitor. This platinum-containing liquid was applied to the surface of ceramics. In the case of pottery and chinaware, firing was performed at 800° C. The metal composition of the thin platinum layer thus formed is shown in Table D-III.

TABLE C-III

|  | (weight %) |
|---|---|
| Au resinate prepared by dissolving powdered sulfurized terpineol gold in a solvent composed of 60% turpentine oil, 20% benzyl alcohol and 20% powdered rosin (27.31%) | 21.97 |
| Pd resinate prepared by dissolving powdered sulfurized terpineol palladium in a solvent composed of 60% turpentine oil, 20% benzyl alcohol and 20% powdered rosin (7.69%) | 7.00 |
| Pt resinate prepared by dissolving powdered sulfurized terpineol platinum in a solvent composed of 60% terpentine oil, 20% benzyl alcohol and 20% powdered rosin (10.00%) | 2.00 |

TABLE C-III-continued

| | (weight %) |
|---|---|
| Rh resinate dissolved in terpentine oil, as sintering inhibitor (4.05%) | 2.50 |
| Cr resinate dissolved in terpentine oil, as heating catalyst (2.74%) | 1.50 |
| Bi resinate dissolved in terpentine oil, as adhesive (6.22%) | 8.00 |
| Powdered rosin | 22.24 |
| Solvent composed of 90% toluene and 10% benzyl alcohol | 34.79 |

TABLE D-III

| Au | 81.32 |
|---|---|
| Pd | 7.29 |
| Pt | 2.71 |
| Rh | 1.37 |
| Cr | 0.56 |
| Bi | 6.75 |

The sintering-free platinum layer having the metal composition shown in Table D-III was tested for boiling alkali resistance under the same conditions as used in Comparative Example I. The platinum layer was completely peeled off by about 1 hour of boiling even in the case of firing at 800° C.

COMPARATIVE EXAMPLE IV

A gold-containing liquid mat overglaze composition was prepared by adding powdered gold to a gold-containing liquid having a gold content of 11% and using rhodium as a sintering inhibitor according to the formulation shown in Table C-IV. This liquid composition for mat gold layer formation was applied to the surface of ceramics In the case of pottery and chinaware, firing was performed at 700° C. to 800° C. The metal composition of the mat gold layer thus formed is shown in Table D-IV.

TABLE C-IV

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 40.28 |
| Rh resinate dissolved in terpentine oil, as sintering inhibitor (4.05%) | 1.31 |
| Cr resinate dissolved in terpentine oil, as heating catalyst (2.74%) | 0.29 |
| Bi resinate dissolved in terpentine oil, as adhesive (6.22%) | 3.79 |
| Powdered gold | 0.70 |
| Powdered rosin | 24.13 |
| Solvent composed of 90% toluene and 10% benzyl alcohol | 29.50 |

TABLE D-IV

| Au | 60.12 |
|---|---|
| Rh | 0.29 |
| Cr | 0.04 |
| Bi | 1.29 |
| Powered gold | 38.26 |

The thin, sintering-free, mat gold layer having the metal composition shown in Table D-IV was tested for boiling alkali resistance under the same conditions as used in Comparative Example I. The thin mat gold layer was completely peeled off by about 50 minutes of boiling in the case of firing at 700° C., and by about 1 hour and 20 minutes of boiling in the case of firing at 800° C.

COMPARATIVE EXAMPLE V

A gold-containing paste overglaze color composition having a gold content of 11% was prepared according to the formulation shown in Table C-V using rhodium as a sintering inhibitor. This gold paste was applied to the surface of ceramics by screen printing. In the case of pottery and chinaware, firing was performed at 600° C. to 800° C. The metal composition of the thin gold layer thus formed is shown in Table D-V.

TABLE C-V

| | (weight %) |
|---|---|
| Au resinate prepared by dissolving powdered sulfurized terpineol gold in a solvent composed of 60% turpentine oil, 20% benzyl alcohol and 20% powdered rosin (27.31%) | 40.28 |
| Rh resinate dissolved in terpentine oil, as sintering inhibitor (4.05%) | 1.35 |
| Cr resinate dissolved in terpentine oil, as heating catalyst (2.74%) | 1.53 |
| Bi resinate dissolved in terpentine oil, as adhesive (6.22%) | 4.47 |
| Sulfurized balsam | 6.00 |
| Powdered rosin | 18.55 |
| Solvent composed of 90% toluene and 10% benzyl alcohol | 27.82 |

TABLE D-V

| Au | 96.70 |
|---|---|
| Rh | 0.48 |
| Cr | 0.37 |
| Bi | 2.45 |

The thin, sintering-free, uniform and bright gold layer having the metal composition shown in table D-V was tested for boiling alkali resistance under the same conditions as used in Comparative Example I to give poor results similar to those obtained in Comparative Example I.

As is evident from the results obtained in the above examples and comparative examples, the noble metal-containing overglaze color composition according to the invention which is in a liquid or paste form and to be applied to ceramics and in which the conventional single use of rhodium as sintering inhibitor for the thin noble metal layer to be formed by firing on the ceramic surface is avoided by using thorium as a sintering inhibitor either alone or in combination with a small amount of rhodium can produce a sintering inhibiting effect at least comparable to that obtainable by the single use of rhodium. Thorium is much less expensive, with much more sources being available therefor, as compared with rhodium.

Furthermore, as compared with the single use of rhodium, the use of thorium can produce a marked improvement in the alkali resistance of the thin noble metal layer formed by firing on the ceramic surface, so that the pretty noble metal mirror surface can be maintained for a prolonged period of time even under severe conditions of use.

In the foregoing, the present invention has bene explained in detail by giving a number of typical examples. It is to be noted, however, that said examples have been given only for illustrative purposes and are by no means limitative of the scope of the present invention and that any modification or variation made without departing the scope of any of the appended claims should fall within the scope of the present invention.

What is claimed is:

1. A noble metal-containing overglaze composition in liquid or paste form for application to ceramics comprising a solution or paste comprising a resinate of at least one noble metal selected from the group consisting of gold, platinum and palladium, chromium resinate, a sintering inhibitor, an adhesive, rosin and a solvent, said sintering inhibitor comprising thorium resinate in an amount sufficient to inhibit sintering.

2. A noble metal-containing overglaze composition according to claim 1 wherein thorium is present in an amount of 1 to 8 parts by weight per 100 parts by weight of said noble metal.

3. A noble metal-containing overglaze composition according to claim 1 wherein said adhesive comprises bismuth resinate and wherein bismuth is present in an amount of from 1 to 10 parts by weight per 100 parts by weight of said noble metal.

4. A noble metal-containing overglaze composition according to claim 1 further comprising rhodium resinate and wherein rhodium is present in an amount of from 0.02 to 3 parts by weight per 100 parts by weight of said noble metal.

5. A noble metal-containing overglaze composition according to claim 1 whereas chromium is present in an amount of from 0.1 to 1.5 parts by weight per 100 parts by weight of said noble metal.

* * * * *